United States Patent
Zhang

(10) Patent No.: US 8,028,627 B2
(45) Date of Patent: Oct. 4, 2011

(54) GAS GENERATOR AND METHOD FOR INFLUENCING A GAS FLOW IN A GAS GENERATOR

(75) Inventor: Jiang Zhang, Siegen (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/659,935

(22) Filed: Mar. 25, 2010

(65) Prior Publication Data

US 2010/0186617 A1     Jul. 29, 2010

Related U.S. Application Data

(63) Continuation of application No. PCT/EP2008/063156, filed on Oct. 1, 2008.

(30) Foreign Application Priority Data

Oct. 5, 2007 (DE) .................. 10 2007 048 736

(51) Int. Cl.
C06D 5/00 (2006.01)
B60R 21/26 (2011.01)
(52) U.S. Cl. ...................................... 102/530; 280/741
(58) Field of Classification Search .................. 102/530, 102/531; 280/740, 741, 742, 736, 737
See application file for complete search history.

(56) References Cited

U.S. PATENT DOCUMENTS

| | | | |
|---|---|---|---|
| 4,886,293 A | 12/1989 | Weiler et al. | |
| 4,927,175 A | 5/1990 | Föhl | |
| 5,003,887 A | 4/1991 | Unterforsthuber et al. | |
| 5,054,811 A | 10/1991 | Unterforsthuber et al. | |
| 5,433,476 A | 7/1995 | Materna et al. | |
| 5,738,372 A | 4/1998 | Lowe et al. | |
| 7,007,610 B2 * | 3/2006 | Karlin et al. | 102/531 |
| 7,156,025 B2 * | 1/2007 | Ostin | 102/530 |
| 7,343,862 B2 * | 3/2008 | McCormick | 102/530 |
| 7,641,231 B2 | 1/2010 | Tieu | |
| 2006/0086408 A1 | 4/2006 | Tieu | |
| 2008/0111359 A1 | 5/2008 | Abaziou | |

FOREIGN PATENT DOCUMENTS

| | | |
|---|---|---|
| DE | 38 31 641 A1 | 2/1990 |
| DE | 38 42 145 A1 | 6/1990 |
| DE | 39 21 472 C1 | 11/1990 |
| DE | 39 21 473 C1 | 11/1990 |
| DE | 195 27 554 A1 | 4/1996 |
| DE | 297 13 285 U1 | 11/1997 |
| DE | 20 2004 016 556 U1 | 4/2005 |
| EP | 0 360 902 A1 | 4/1990 |
| FR | 2 876 968 | 4/2006 |

OTHER PUBLICATIONS

German Examination Report in DE Appln No. 10 2007 048 736.5-21 dated Jun. 24, 2010.

* cited by examiner

*Primary Examiner* — James Bergin
(74) *Attorney, Agent, or Firm* — Foley & Lardner LLP

(57) ABSTRACT

The invention relates to a gas generator for an occupant protection system, particularly for an airbag module in a motor vehicle, having an outer housing, an interior space formed in the outer housing for receiving a gas generating substance, an outflow opening for discharging gas generated in the interior space out of the gas generator, and a flow connection between the interior space and the outflow opening. According to the invention, the cross section of the flow connection between the interior space and the outflow opening is designed to be temperature-dependently variable. Further, a method for influencing a gas flow in a gas generator is described.

9 Claims, 4 Drawing Sheets

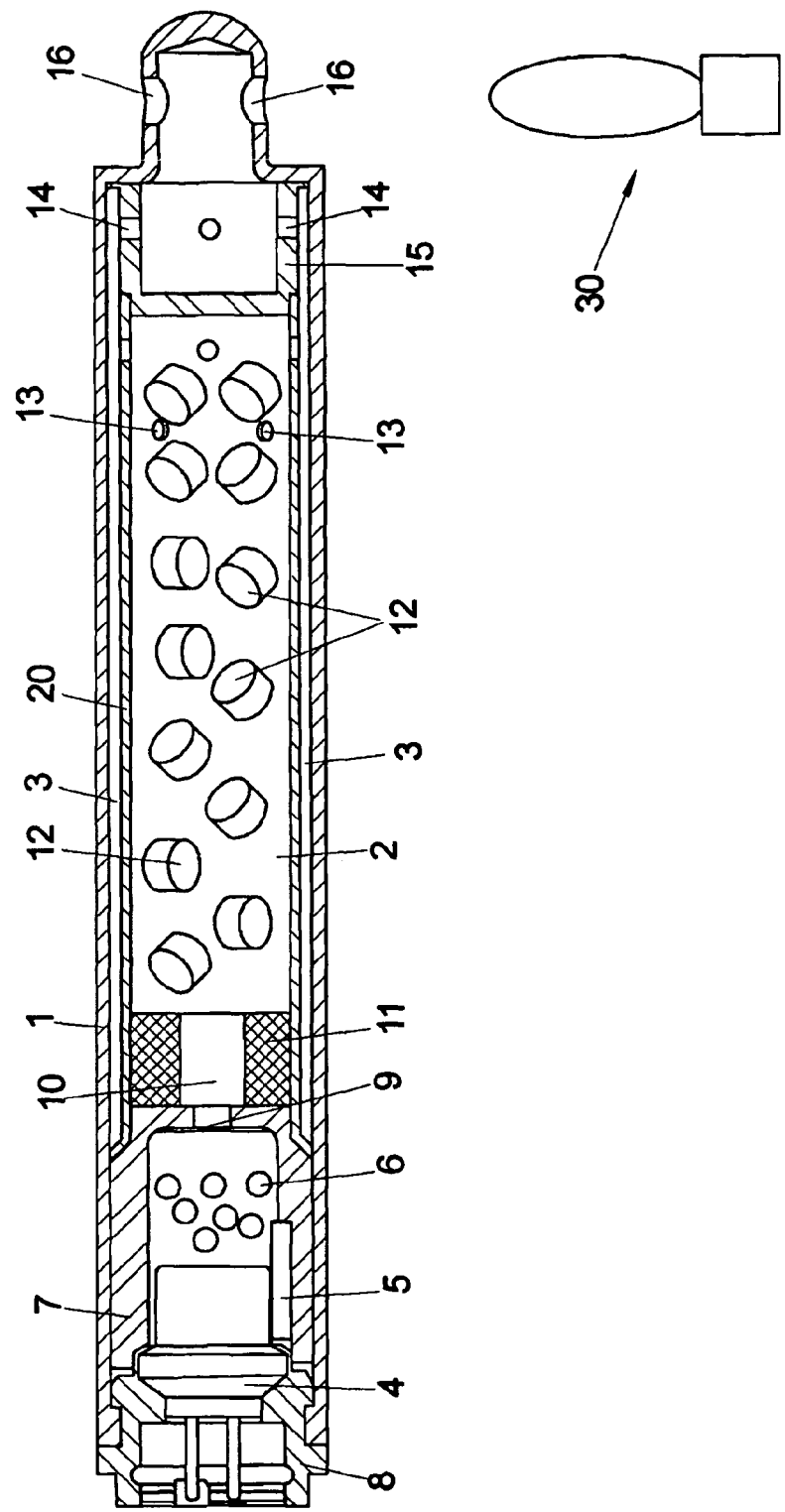

GAS GENERATOR AND METHOD FOR INFLUENCING A GAS FLOW IN A GAS GENERATOR

CROSS-REFERENCE TO RELATED PATENT APPLICATIONS

This application is a continuation of International Application PCT/EP2008/063156, which has an international filing date of Oct. 1, 2008; this International Application was not published in English, but was published on in German on Apr. 16, 2009 as WO 2009/047186 A1. The foregoing Application is incorporated herein by reference in its entirety.

BACKGROUND

The present invention relates to a gas generator and a method for influencing a gas flow in a gas generator.

Such a gas generator is for instance suitable for an application in an occupant protection system like an airbag system in a motor vehicle for providing gas that is used for inflating an airbag. Such gas generators have to satisfy safety requirements to which amongst other things also passing the so-called bonfire test (a fire test) belongs. Thereby, the gas generator has to be designed and produced such that it is not fragmented by the heat of a fire, i.e., does not break apart. These safety requirements are prescribed by the motor vehicle producer as well as by the legislature for the admission of gas generators in motor vehicles by the Federal Institute of materials research and test.

Three or four possible positions of a gas generator are provided with respect to a flame for the bonfire test. For example, in case of a tubular gas generator four positions are to be tested:

1. a position in which the igniter of the gas generator is oriented towards the flame,
2. a position in which the igniter of the gas generator is oriented away from the flame,
3. a position in which the generator axis lies horizontally and a flame impingement of the gas generator takes place in the middle of the gas generator, and
4. a position in which the generator axis is in turn arranged horizontally, the flame impingement however occurs at a location of the gas generator being apart from the igniter.

It is known from the state of the art to employ an early ignition means (a so-called auto ignition material) in the form of pills or granules for solving the so-called bonfire problem (i.e. of the flame impingement of the gas generator while avoiding fragmentation of the same at the same time). The early ignition means comprises a lower self ignition temperature (auto ignition temperature) than a gas kit that is used in the gas generator for the actual gas production. For instance, self ignition means having a self ignition temperature of 160° C. are known. Usually, employed pyrotechnical gas kits are however much more heat resistant and comprise a higher ignition temperature or a higher exothermic reaction temperature than an early ignition means. For instance, gas kits having an exothermic reaction temperature of 260° C. are known.

One function of an early ignition means consists in causing a controlled conversion of the actual gas kit by means of an early ignition. The notion "controlled conversion" thereby means a controlled and reasonable burning rate of the gas kit. The burning rate of the gas kit increases with temperature of the gas kit before conversion. The higher the burning rate of the gas kit, the higher the internal pressure inside the gas generator. In case the internal pressure in the gas generator or in the burning chamber exceeds the usual measure, the danger of a fragmentation of the gas generator increases. This is particularly the case when the structure material of the gas generator is a weakened one due to a strong heating anyway. Thus, it is known from the state of the art that by means of a strong heating of the structure material of the gas generator in a bonfire test the structural performance of the structure material is lowered. By means of an early ignition of the early ignition means and an early conversion of the actual gas kit caused herewith at relatively low starting temperature, a load acting onto the structure material of the gas generator is kept low as a consequence of the lower internal gas pressure in the gas generator, so that the danger of a fragmentation is decreased.

The above stated function can be fulfilled particularly well by the early ignition means in case the heat acting onto the gas generator upon flame impingement of the gas generator during the bonfire test can rapidly get to the early ignition means by means of heat transfer. This is particularly the case when an advantageous test position exists, for instance in case the igniter is oriented towards the flame. Due to the distance of the early ignition means to the flame or the fire, respectively, being small in this position, the self ignition temperature of the self ignition means can be rapidly reached by advantageous heat transfer.

In case of a disadvantageous position during the bonfire test like for instance a horizontal alignment of the gas generator and a flame impingement at a location of the gas generator facing away from the early ignition means or the igniter, respectively, a delayed activation of the early ignition means may result, since a relatively large distance between the flame and the early ignition means causes a long period of time for a transfer of heat to the early ignition means. This means, that in this case the gas kit is already relatively hot upon ignition so that a higher burning rate and therefore a higher internal pressure in the burning chamber of the gas generator is reached. In addition, the generator housing has significantly lost rigidity due to the increased temperature. In the worst case a fragmentation of the gas generator may occur during this part of the bonfire test.

From U.S. Pat. No. 5,738,372 a gas generator is known that comprises a supply connection, through which an interior space of the gas generator can be filled with gas being under pressure in the interior space. After filling the interior space, the supply connection can be closed by a sealing that is deformed in case of high temperatures or melts. Hereby, the supply connection can be set free again so that it represents a safety valve of the gas generator that is opened in case of high temperatures. The gas stored in the gas generator does then however not leave the gas generator at the gas outlet but at the supply connection of the gas generator.

It would be advantageous to provide for a gas generator that passes the bonfire test in an especially advantageous manner.

SUMMARY

One disclosed embodiment relates to a gas generator that is suitable for an occupant protection system, particularly for an airbag module in a motor vehicle. The gas generator comprises an outer housing and an inner housing formed inside the outer housing, which serves for containing a gas generating substance. Usual pyrotechnical gas kits can be used as gas generating substances, which can consist out of a solid, combustible material that generates a large amount of gas upon combustion. The interior space of the gas generator is connected to an outflow opening of the gas generator via a flow connection through which gas generated in the gas generator flows out of the gas generator into an associated airbag after combustion of the gas generating substance.

A further embodiment relates to a method for influencing a gas flow in a gas generator. According to this method a gas generator is provided, having an outer housing, an interior space formed in the outer housing for receiving a gas generating substance, an outflow opening for discharging a gas generated in the interior space out of the gas generator, and a flow connection between the interior space and the outflow opening. At least a part of the cross section of the flow connection is closed by a sealing element. By increasing the temperature of such a region of the gas generator to which the sealing element is associated to up to reaching or exceeding a deformation temperature, a deformation of the sealing element is then achieved by transferring heat to the same. Thereby, the cross section of the flow connection is changed.

BRIEF DESCRIPTION OF THE DRAWINGS

These and other features, aspects and advantages of the present invention will become apparent from the following description, appended claims, and the exemplary detailed description of embodiments of the invention.

FIG. 3 shows a schematical view onto a test position in a bonfire test.

DETAILED DESCRIPTION

Figure 1:
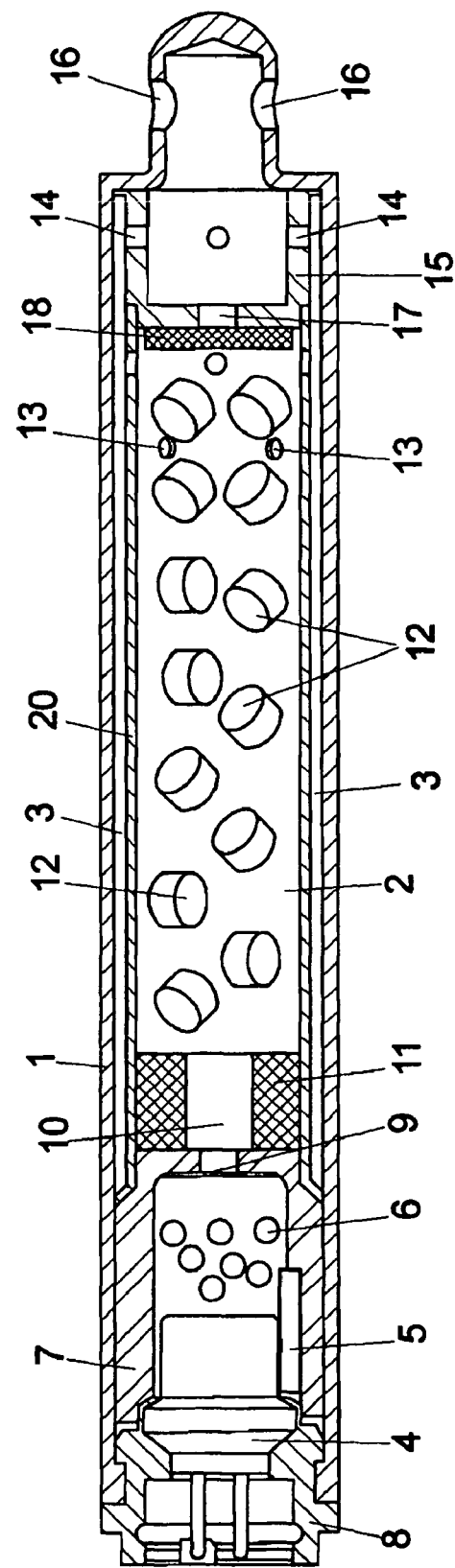
FIG. 1 shows a cross section through a first embodiment of a gas generator.

According to a first aspect of the invention a gas generator is provided that is suitable for an occupant protection system, particularly for an airbag module in a motor vehicle. The gas generator comprises an outer housing and an inner housing formed inside the outer housing, which serves for containing a gas generating substance. Usual pyrotechnical gas kits can be used as gas generating substances, which can consist out of a solid, combustible material that generates a large amount of gas upon combustion. The interior space of the gas generator is connected to an outflow opening of the gas generator via a flow connection through which gas generated in the gas generator flows out of the gas generator into an associated airbag after combustion of the gas generating substance.

According to the invention, the cross section of this flow connection between the interior space and the outflow opening is designed to be variable temperature-dependently.

In a variant, the cross section of the flow connection between the interior space and the outflow opening is increased when a deformation temperature is reached or exceeded. The increase of the cross section of the flow connection can take place for instance by providing for an additional opening for connecting the interior space to the outflow opening.

In a variant of the invention the deformation temperature amounts to approximately 250° C., 240° C., 230° C., 220° C., 210° C., 200° C., 190° C., 180° C., 170° C., 160° C. or 150° C. or to a value even lower than 150° C. Thereby, the deformation temperature is not necessarily to be considered as an exact temperature pinpointed to a precise value, but rather as a temperature occurring inside a certain range. Thus, the deformation temperature is a temperature, at which a material experiences a deformation.

In order to provide for an additional opening for the flow connection between the interior space and the outflow opening in an especially simple way, an opening closed by a sealing element is formed between the interior space and the outflow opening in a variant. Particularly, the opening is completely closed by the sealing element. Instead of a single opening, several openings can be provided which are closed by a single sealing element. Furthermore, it is possible that in case of several openings each of these openings is closed by a single sealing element. It is also possible that one sealing element closes two or more openings, wherein however more than one sealing element are present, so as to close all openings that have to be closed.

In an alternative embodiment the sealing element comprises a material having a melting temperature of not more than approximately 250° C., particularly not more than approximately 240° C., 230° C., 220° C., 210° C., 200° C., 190° C., 180° C., 170° C., 160° C. or 150° C. The melting temperature may also be even lower than approximately 150° C. The melting temperature of the material is to be regarded as a special case of a deformation temperature. At the melting temperature the material is not only deformable, but melts at this temperature. It is possible that the sealing element entirely consists of a material having one of the afore-mentioned melting temperatures. The material does not need to be a pure substance, in fact also mixtures of different substances can be used for forming the material.

In a variant the sealing element comprises a synthetic material, particularly polypropylene or polyamide. Polypropylene comprises a melting temperature of approximately 160° C. and polyamide a melting temperature of approximately 220° C.

In a further variant, the synthetic material comprises fiber glass. By adding fiber glass the rigidity of the synthetic materials is increased, wherein the melting temperature of the synthetic material is not influenced substantially.

In a variant, an additional flow path is provided by changing the cross section of the flow connection between the interior space and the outflow opening. Gas that is generated out of the gas kit arranged in the interior space upon a combustion can then flow through this additional flow path on the way from the interior space to the outflow opening of the gas generator in addition to the originally existing flow path.

In order to allow for an especially advantageous pressure reduction and gas discharge out of the interior space at an increased temperature in the interior space, the additional flow path is designed such in an alternative embodiment that gas that flows through this additional flow path is more rarely deflected than gas flowing through the originally existing flow path. This means that a more direct connection is provided between the interior space and the outflow opening as is the case without the additional flow path.

A further aspect of the invention relates to a method for influencing a gas flow in a gas generator. According to this method a gas generator is provided, having an outer housing, an interior space formed in the outer housing for receiving a gas generating substance, an outflow opening for discharging a gas generated in the interior space out of the gas generator, and a flow connection between the interior space and the outflow opening. At least a part of the cross section of the flow connection is closed by a sealing element. By increasing the temperature of such a region of the gas generator to which the sealing element is associated to up to reaching or exceeding a deformation temperature, a deformation of the sealing element is then achieved by transferring heat to the same. Thereby, the cross section of the flow connection is changed.

Particularly, the part of the cross section that is closed by the sealing element before is set free. Thereby, an additional cross section of the flow connection is provided.

The region of the gas generator at which the temperature is increased up to the deformation temperature or beyond, is preferably a portion of the interior space at which the sealing element is arranged to close a part of the cross section of the flow connection. A direct temperature impact from outside on the interior space can also take place at another region of the gas generator or portion of the interior space, wherein then a heat transfer for a corresponding temperature increase at the region of the gas generator or the portion of the interior space at which the sealing element is arranged is achieved.

This method for changing the cross section is to be applied advantageously in particular in a gas generator of the above-described kind. The features stated in the sub claims with respect to the gas generator are in this respect also applicable in variants and alternative embodiments of the present method, so that it is referred to the respective explanations above. Further, the explanations regarding the method are also applicable to the claimed gas generator.

The FIG. 1 shows a cross section through a gas generator, having an outer housing 1, a combustion chamber 2 arranged in the outer housing as an interior space, and a plenum 3 arranged between the outer housing 1 and the combustion chamber 2, through which gas generated in the combustion chamber 2 can flow.

Furthermore, inside the outer housing 1 an electrical igniter 4, an early ignition means 5 and an amplification charge 6 are provided on the left hand side of gas generator shown in FIG. 1. The amplification charge 6 is also denoted as booster charge. The igniter 4, the early ignition means 5 and the amplification charge 6 are arranged together in a reinforcing cup 7 that is at least partially arranged in the outer housing 1 without a gap being comparable to the plenum 3. The igniter 4 thereby protrudes into the reinforcing cup 7, and is however held on his part by an igniter receptacle 8. The igniter 4 is to be connected in a usual manner via an electrical connection cable to an electrical voltage source and to be triggered by the same in the activation case.

The interior of the reinforcing cup 7, in which the amplification charge 6 and the early ignition means 5 reside, is separated from a flow channel 10 by a film- or membrane-like closing element 9, by means of which a connection between the combustion chamber 2 and the interior of the reinforcing cup 7 is established after destruction of the closing element 9.

At the side of the combustion chamber 2 facing the reinforcing cup 7 a volume compensation means 11 in the form of an elastic metal fiber fleece is arranged in addition. This volume compensation means 11 makes sure, that a pyrotechnical gas kit 12 in the form of pills or granules is held in the combustion chamber 2 in a way, that no rattling noise is caused by the gas kit 12 upon movement of the gas generator. The gas kit 12 constitutes a gas generating means. For reasons of clarity not all of the pills or particles constituting the gas kit 12 are furnished with corresponding reference signs.

The combustion chamber 2, that is designed cylindrical, comprises on its peripheral surface first openings 13, which are designed as breakouts or holes and establish a connection between the interior of the combustion chamber 2 and the plenum 3. For reasons of clarity only some openings 13 are shown graphically in FIG. 1. The plenum 3 is connected via second openings 14 to the interior of a hollow deflection element 15, so that gas which resides in the plenum 3 can get into the deflection element 15 through the second openings 14. Finally, gas can exit the gas generator out of the deflection element 15 via outlets 16 and fill an airbag associated to the gas generator.

At the side of the deflection element 15 facing the combustion chamber 2 a further opening 17 is formed that is closed by a plate 18. The plate 18 constitutes a sealing element and is glued in this embodiment onto the outside of the deflection element 15 facing the combustion chamber 2. The side of the deflection element 15 facing the combustion chamber 2 constitutes a portion of the combustion chamber 2. The plate 18 is made out of a synthetic material that comprises a melting temperature which is significantly lower than the melting temperature of steel (1540° C.) and may lie for instance around approximately 130 to 260° C.

The further opening 17 and the plate 18 form a valve or overheating valve together that can be activated by heat. In case the outer housing 1 of the gas generator is heated during a bonfire test by means of a flame, for instance, the heat of the flame acting on the gas generator is transferred from the outer housing 1 via the deflection element 15 to the outside wall 20 of the combustion chamber 2. Thereby, the gas kit 12 present in the combustion chamber 2 as well as the plate 18 formed at the deflection element 15 are warmed. Finally, with increasing temperature, a deformation temperature of the plate 18 is reached. At this deformation temperature, the material, out of which the plate 18 consists, starts to become soft and to deform. In such a weakened state of the plate 18 a small overpressure in the combustion chamber suffices to let the plate 18 burst. Thereby, the further opening 17 located below is set free, so that gas developing in the combustion chamber 2 can flow into the deflection element 15 through the further opening 17. The originally existing flow path from the combustion chamber 2 into the deflection element 15 through the first openings 13, the plenum 3 and the second openings 14 is still maintained.

In case a warming of the gas generator and therewith of the deflection element 15 and the plate 18 occurs, also the melting temperature of the plate 18 can be reached. In this case the plate 18 melts and already sets free the further opening 17 without the necessity of a low overpressure in the combustion chamber 2. In such a case, gas generated in the combustion chamber 2 can flow right from the start, in addition to the flow path through the first openings 13, the plenum 3 and the second openings 14, also through the further opening 17 into the deflection element 15 and from there through the outflow openings 16 into an associated airbag.

In case the gas generator is not heated up to the deformation or melting temperature of the plate 18, the plate 18 stays intact and the further opening 17 stays closed. The additional flow path from the combustion chamber 2 through the further opening 17 into the deflection element 15 and from there through the outflow openings 16 out of the gas generator is not accessible in this case.

This means, that by choosing the material of the plate 18, a temperature-dependent opening of the overheating valve formed by the plate 18 and the further opening 17 is possible. In this way it is possible that upon a merely short-termed heating of the gas generator the further opening 17 is not set free and gas generated in the combustion chamber 2 can only flow through the first openings 13, the plenum 3 and the second openings 14 into the deflection element 15.

Figure 4A:
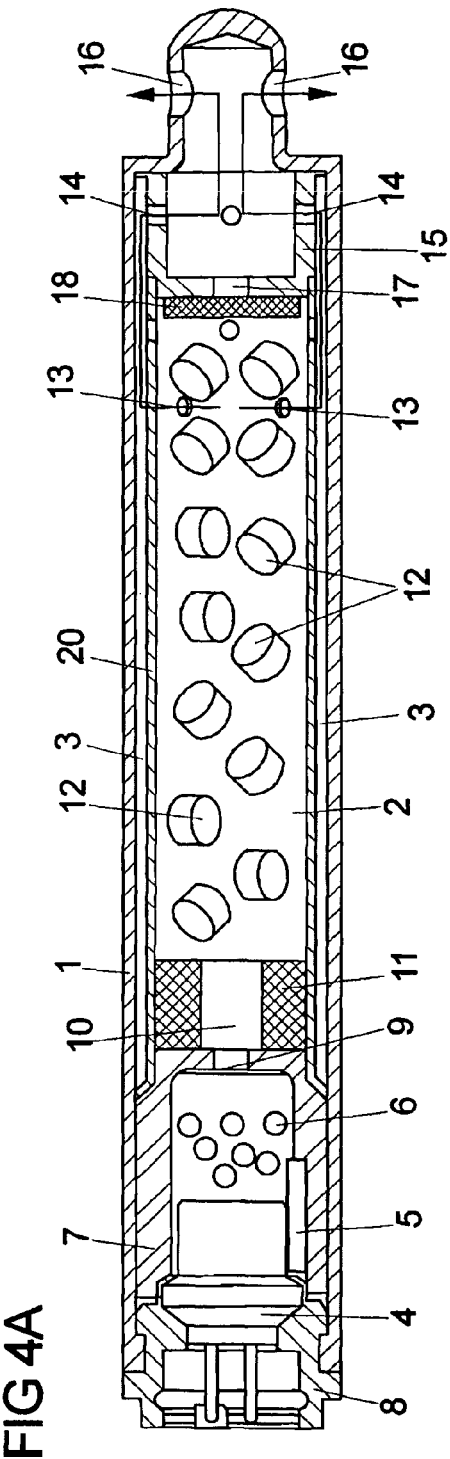
FIG. 4a shows possible flow paths of gas out of the gas generator of FIG. 1 in case of a closed overheating valve.

Such a gas flow out of the combustion chamber 2 into the deflection element 15 is desired during a normal operation of the airbag and also possible by means of the gas generator shown in FIG. 1 (cf. also FIG. 4A in this respect). For instance, in case of an airbag activation caused by an accident, at first the igniter 4 is activated by applying a voltage. The igniter 4 ignites the early ignition means 5 and the amplification charge 6. Thereby, hot combustion gases develop in the reinforcing cup 7, which cause an increased pressure in the reinforcing cup 7. Due to this increased pressure, the closing element 9 is destroyed, so that the hot combustion gases can flow through the flow channel 10 into the combustion chamber 2. Thereby, the high temperature of the combustion gases generates a conversion of the gas kit 12 in the combustion chamber 2, whereby a large amount of gas is generated. This gas then flows through the first openings 13 into the plenum 3 and from there through the second openings 14 into the deflection element 15. The gas upon flowing into the plenum as well as upon flowing out of the plenum 3 is thereby deflected by the second openings 14 into the deflection element 15—the gas experiences at least two changes of direction. In the deflection element 15 the gas is in addition further deflected towards the outflow openings 16, in order to flow through the same out of the gas generator into an associated airbag.

In case the deflection element 15 or the interior of the combustion chamber 2 is warmed strong enough by a warming of the gas generator, for example during a bonfire test, to let the plate 18 melt, the opening 17 is set free. In case the gas kit 12 is now ignited due to a self ignition as a consequence of a high temperature or by inflow of hot gases out of the reinforcing cup 7 corresponding to the above explanation, developing gases can also directly flow through the further opening 17 into the deflection element 15. Thereby, these gases do not experience a change of direction until they are guided out of the deflection element 15 through the outflow openings 16 into an associated airbag.

Thereby, significantly higher gas outflow velocities are possible through the further opening 17 compared to a flow through the first openings 13, the plenum 3 and the further openings 14 into the deflection element 15. Consequently, an increased internal pressure fastly developing in the combustion chamber 2 due to an increased temperature and accompanying increased burning rate can be dissipated more easily. Critical pressures that can cause a fragmentation of the gas generator are not generated.

By using an overheating valve formed by the plate 18 and the further opening 17 the application of a further early ignition means in the region of the burning chamber 2 facing the outflow openings 16 becomes unnecessary. Such a provision of a further early ignition means in this region could also prevent the temperature in the combustion chamber 2 from increasing, before an ignition of the gas kit 12, up to temperatures at which a conversion of the gas kit already leads to a very high burning rate. Further, it is not necessary regarding the embodiment of FIG. 1 to produce the outer housing 1 of the gas generator or other elements of the gas generator out of a very rigid and heat resistant steel. Regarding the presently described embodiment it also suffices to connect the deflection element 15 to the outside wall 20 of the combustion chamber 2 with help of a plug connection by pressing into one another; an additional welding for increasing the rigidity between these elements of the gas generator is not necessary.

In order to assure the integrity of the plate 18 during a normal functioning of the gas generator, the plate 18 is produced out of a correspondingly rigid or reinforced synthetic material or comprises a sufficient dimensioning of the plate thickness. This has the effect, that upon a usual conversion of the gas kit 12 in the combustion chamber 2, which usually takes about less than 50 ms, the plate 18 is not warmed such that the deformation temperature of the plate 18 is reached. Likewise, the chosen dimensioning of the plate 18 has the consequence that the pressure developing in the combustion chamber 2 can be withstood by the plate 18. This means, that the further opening 17 usually stays closed, so that gas generated in the combustion chamber 2 can only escape through the first openings 13 out of the combustion chamber 2.

In the bonfire test, the gas generator is usually heated several minutes by means of the corresponding flame, so that SU a warming of the plate 18 beyond the deformation or melting temperature can be reached. During a bonfire test the heat transferred from the flame to the gas generator propagates in the gas generator from the location at which the flame hits the gas generator through the parts of the gas generator consisting of steel like the outer housing 1, deflection element 15 and outside wall 20 of the combustion chamber 2. Thereby, the deflecting element 15 reaches temperatures of 200° C., 300° C. and even more than 400° C. The plate 18 fixed on the deflection element 15 is heated correspondingly and starts to get soft and to deform upon reaching the deformation temperature, and upon reaching the melting temperature starts to cross over into the liquid aggregate state. Due to this melting the further opening 17 is set free.

When the ignition temperature of the early ignition means 5 (for instance 160° C.) is reached in the reinforcing cup 7, the early ignition means 5 ignites and ignites on his part the modification charge 6. The hot gases developing thereby ignite on their own part the gas kit 12. The gases generated in the combustion chamber 2 flow to the largest extent through the further opening 17 into the deflection element 15 and from there through the outflow openings 16 into the associated airbag. A smaller fraction of the generated gases flows out of the combustion chamber 2 through the first openings 13, the plenum 3 and the second openings 14 into the deflection element 15 and from there through the outflow openings 16 into the associated airbag.

The provision of a valve (overheating valve) that can be activated by heat formed out of the plate 18 and the further opening 17 is particularly advantageous for tubular gas generators having a large ratio between length and diameter in case of certain bonfire test. The overheating valve can be accomplished by a simple design and has in addition no influence on the performance of the gas generator during normal functioning. Due to the fact that the overheating valve only needs a small space, a compact design of the gas generator is assured in spite of providing an overheating valve. In contrast to an alternative solution of the bonfire problem by means of providing for an additional early ignition means charge, a much cheaper production is achieved.

Figure 2:
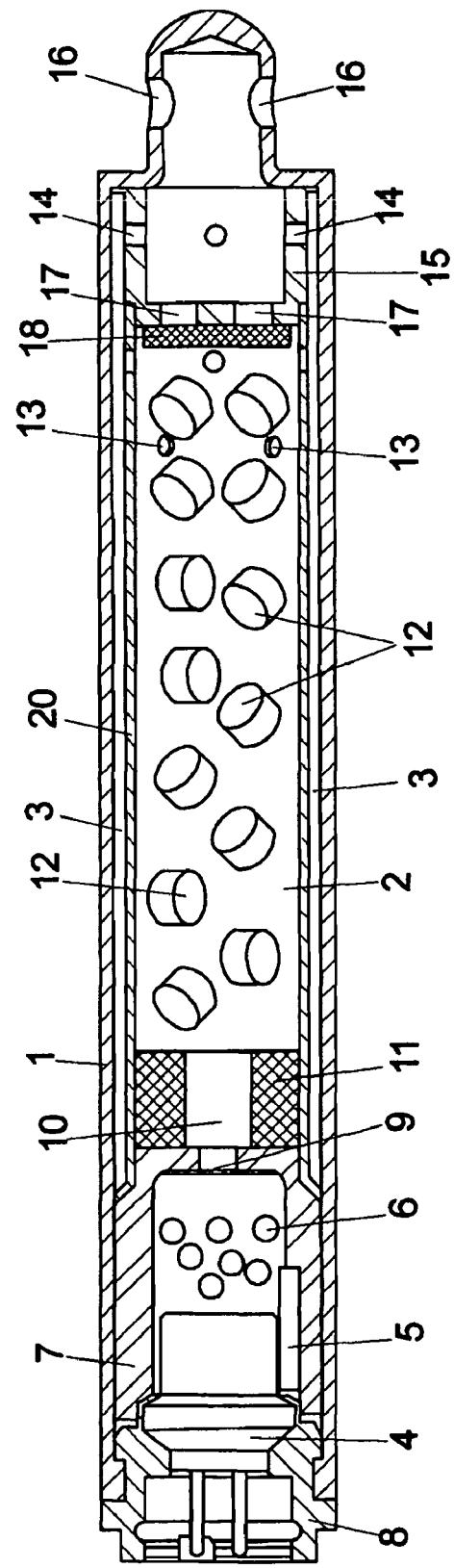
FIG. 2 shows a cross section through a second embodiment of a gas generator.

The FIG. 2 shows a cross section through a further embodiment of a gas generator. This gas generator comprises the same elements like the gas generator shown in FIG. 1, so that it is referred to the above explanations. Identical reference signs are used for identical elements.

In contrast to the gas generator of FIG. 1, the gas generator of FIG. 2 however comprises two further openings 17, which are sealed by a common plate 18 with respect to the combustion chamber 2. In case the plate 18 melts, two openings between the combustion chamber 2 and the interior of the deflection element 15 get free at the same time, so that gas generated in the combustion chamber 2 can flow even faster out of the combustion chamber 2 through the deflection element 15 and the outflow openings 16 to the gas generator.

The number of the further openings 17 is not limited in principle. According thereto, also more than two further openings 17 can be provided. It is conceivable to provide different plates 18 for different further openings 17, wherein the different plates 18 can be produced out of different materials that comprise different melting points. In this way it is possible to vary the cross section of the flow connection between the combustion chamber 2 and the deflection element 15 depending on the temperature of the gas generator. The higher the temperature thereby rises, the more plates 18 melt and the more openings 17 are set free. This means, that in case an especially high internal temperature prevails in the combustion chamber 2, which causes a high burning rate and therewith a high internal pressure in the combustion chamber 2, in principle a larger cross section is available between the combustion chamber 2 and the deflection element 15 or the outflow openings 16.

In case such a large cross section is not needed, since the temperature in the combustion chamber 2 is lower, this is accounted for by the fact that not all plates 18 are melted at lower temperatures of the gas generator and consequently not all further openings 17 between the combustion chamber 2 and the deflection element 15 are set free.

It is also possible to provide only a single plate 18, which however comprises differently deformable or meltable regions, so that further breakouts 17 lying below the plate 18 are also set free depending on the temperature of the gas generator.

The FIG. 3 shows a cross section through a gas generator of usual design that is currently undergoing the bonfire test while being in a disadvantageous bonfire test position. Regarding the single elements of the gas generator it is referred to the explanations above. This usual gas generator thereby comprises numerous elements, which are similar to the gas generators of FIGS. 1 and 2. However, the gas generator of FIG. 3 does not comprise an overheating valve.

In the present bonfire test position, the flame 30 of a burner is directed towards the region of the gas generator in which the outflow openings 16 reside. This region faces away from the region at which the early ignition means 5 is arranged. This means, that in case of not providing an overheating valve the heat of the flame 30 has to propagate at first over the outer housing 1 or the metal parts of the deflection element 15 and the outside wall 20 of the combustion chamber 2 towards the reinforcing cup 7, in order to provide a temperature increase thereabouts, which suffices to reach the ignition temperature of the early ignition means 5.

Since this heat transfer can take a very long time, the interior of the combustion chamber 2 can warm correspondingly. Until it gets to the activation of the early ignition means 5 and the amplification charge 6 and the combustion kit 12 is ignited due to the hot gases developing thereby, the temperature in the combustion chamber 2 is occasionally already so high that the burning rate of the gas kit 12 is so high, that a pressure develops that causes the gas generator to break apart (fragmentation). Thereby, it is to be taken into account that due to the warming by the flame 30 already a weakening of the outer housing 1, the deflection element 15 and/or the outside wall 20 of the combustion chamber 2 may has taken place.

The FIG. 4a shows the gas generator of FIG. 1 in a cross sectional view, wherein possible flow ways on provided flow paths or flow connections of the gas generated in the combustion chamber 2 by conversion of a gas kit 12 are drawn in as arrows. Provided the overheating valve is closed, this means, provided the plate 18 is intact and the further opening 17 stays closed, gas can only flow through the first openings 13 into the plenum 3 and from the latter through the second openings 14 into the deflection element 15 and from the latter through the outflow openings 16 into an associated airbag. In case of this flow, a first deflection of the gas flow occurs upon entering the plenum 3, a second deflection occurs upon leaving the plenum 3 into the deflection element 15 and finally, a further deflection or change of direction occurs in the deflection element 15 on the way to the outflow openings 16 and a last change of direction or deflection of the gas flow occurs upon leaving the deflection element 15 through the outflow openings 16.

In case the overheating valve is opened as described above, an additional flow way or path into the deflection element 15 is available to a gas generated in the combustion chamber 2 through the now freely accessible further opening 17. Thereby, the cross section of the flow connection between the combustion chamber 2 and the outflow openings 16 is increased. Since in case of this additional flow path substantially less changes of direction of the gas flow are necessary, this means, this gas flow is significantly less deflected (namely only one time upon leaving the deflection element 15 through the outflow openings 16 to an associated airbag), the additional flow path provided by the opening of the overheating valve provides less resistance than flow paths through the plenum 3 existing originally.

Figure 4B:
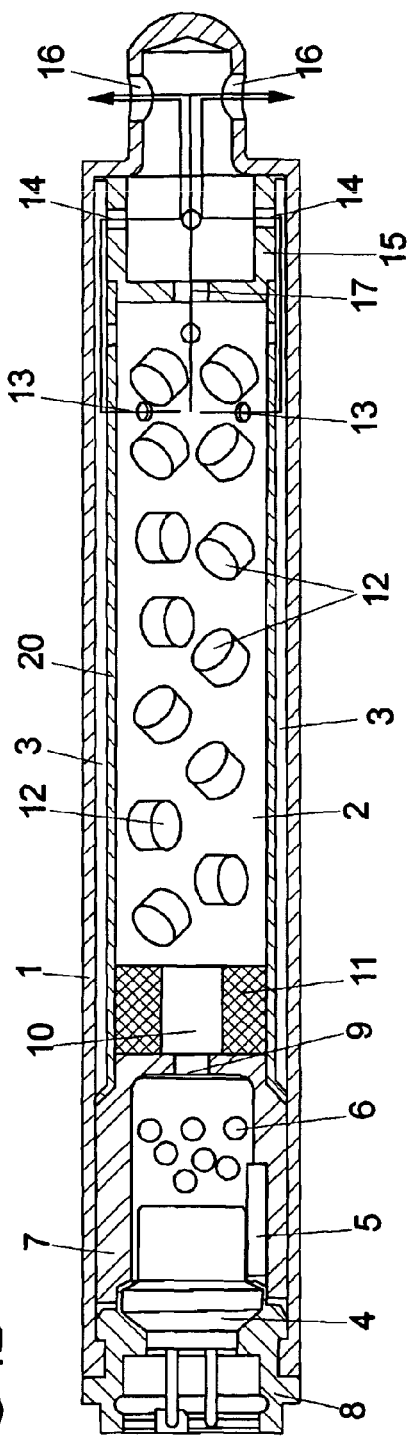
FIG. 4b shows possible flow paths of gas out of the gas generator of FIG. 1 in case of an open overheating valve.

This causes a larger fraction of the gas generated in the combustion chamber 2 to leave the combustion chamber 2 through the further opening 17 than through the first openings 13, the plenum 3 and the second openings 14. Upon looking at the FIGS. 4a and 4b it is directly apparent to the person skilled in the art that the two flow path drawn in there are to be considered only as schematical and the gas generated in the combustion chamber 2 leaves the combustion chamber 2 towards the deflection element 15 and the deflection element 15 through the outflow openings 16 only in an idealized manner on the flow paths drawn in FIGS. 4a and 4b. In fact, swirlings of the gas flow occur, which are however not considered here for reasons of simplicity.

The priority application, German Patent Application No. 10 2007 048 736.5, filed Oct. 5, 2007 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A gas generator for an occupant protection system in a motor vehicle, comprising:
   an outer housing;
   a gas generating substance;
   an interior space formed in the outer housing for containing the gas generating substance;
   an outflow opening for discharging gas generated in the interior space out of the gas generator, and
   a flow connection in a form of a channel of the gas generator between the interior space and the outflow opening,
   wherein a cross section of the flow connection between the interior space and the outflow opening is designed to be temperature-dependently variable,
   wherein by changing the cross section of the flow connection, an additional flow path between the interior space and the outflow opening is provided, and
   wherein the additional flow path is designed such that gas flowing towards the outflow opening through the additional flow path experiences a smaller number of changes of direction than gas flowing through a flow path existing before the change of the cross section.

2. The gas generator according to claim 1, wherein the cross section of the flow connection between the interior space and the outflow opening is enlarged when a deformation temperature is reached or exceeded at a portion of the interior space.

3. The gas generator according to claim 2, wherein the deformation temperature amounts to 250° C. or less.

4. The gas generator according to claim 1, further comprising:
   a further opening between the interior space and the outflow opening; and
   a sealing element closing the further opening.

5. The gas generator according to claim 4, wherein the sealing element comprises a material having a melting temperature of not less than 250° C.

6. The gas generator according to claim 4, wherein the sealing element comprises a synthetic material.

7. The gas generator according to claim 6, wherein the synthetic material comprises fiber glass.

8. The gas generator according to claim 6, wherein the synthetic material comprises polypropylene or polyamide.

9. The gas generator according to claim 4, wherein when a deformation temperature is reached or exceeded at a portion of the interior space, the sealing element deforms and melts to unblock the further opening.

* * * * *